US 9,785,545 B2

(12) United States Patent
Huang

(10) Patent No.: US 9,785,545 B2
(45) Date of Patent: Oct. 10, 2017

(54) METHOD AND APPARATUS FOR PROVIDING DUAL MEMORY ACCESS TO NON-VOLATILE MEMORY

(71) Applicant: Yiren Ronnie Huang, San Jose, CA (US)

(72) Inventor: Yiren Ronnie Huang, San Jose, CA (US)

(73) Assignee: CNEX Labs, Inc., San Jose, CA (US)

( * ) Notice: Subject to any disclaimer, the term of this patent is extended or adjusted under 35 U.S.C. 154(b) by 79 days.

(21) Appl. No.: 14/329,578

(22) Filed: Jul. 11, 2014

(65) Prior Publication Data

US 2015/0019798 A1 Jan. 15, 2015

Related U.S. Application Data

(60) Provisional application No. 61/846,519, filed on Jul. 15, 2013.

(51) Int. Cl.
*G06F 12/0862* (2016.01)
*G06F 12/02* (2006.01)

(52) U.S. Cl.
CPC ...... *G06F 12/0246* (2013.01); *G06F 12/0862* (2013.01); *G06F 2212/602* (2013.01); *G06F 2212/7201* (2013.01)

(58) Field of Classification Search
CPC ............... G06F 12/0246; G06F 9/2004; G06F 9/30087; G06F 9/345; G06F 3/0613; G06F 9/355; G06F 12/1081; G06F 13/28; G06F 3/0656; G11C 6/102; H04L 12/06

USPC ......................................................... 711/105
See application file for complete search history.

(56) References Cited

U.S. PATENT DOCUMENTS

| | | | | |
|---|---|---|---|---|
| 5,150,471 A * | 9/1992 | Tipon | .................. | G06F 12/0292 711/202 |
| 5,537,567 A * | 7/1996 | Galbraith | ............ | G06F 11/1076 711/114 |
| 5,539,895 A * | 7/1996 | Bishop | .................... | G06F 12/08 711/117 |
| 6,286,092 B1 * | 9/2001 | Frank | .................. | G06F 12/1009 711/207 |
| 6,704,835 B1 * | 3/2004 | Garner | ................ | G06F 12/0804 365/185.33 |
| 8,504,798 B2 * | 8/2013 | Conley | ............... | G06F 12/0246 711/100 |
| 8,526,234 B1 * | 9/2013 | Asnaashari | ............. | G06F 13/00 365/158 |

(Continued)

*Primary Examiner* — Midys Rojas
*Assistant Examiner* — Khoa D Doan
(74) *Attorney, Agent, or Firm* — James M. Wu; JW Law Group

(57) ABSTRACT

A method and system for providing a dual memory access to a non-volatile memory device using expended memory addresses are disclosed. The digital processing system such as a computer includes a non-volatile memory device, a peripheral bus, and a digital processing unit. The non-volatile memory device such as a solid state drive can store data persistently. The peripheral bus, which can be a peripheral component interconnect express ("PCIe") bus, is used to support memory access to the non-volatile memory device. The digital processing unit such as a central processing unit ("CPU") is capable of accessing storage space in the non-volatile memory device in accordance with an extended memory address and offset.

20 Claims, 12 Drawing Sheets

(56) References Cited

U.S. PATENT DOCUMENTS

| | | | |
|---|---|---|---|
| 8,996,790 B1* | 3/2015 | Segal | G06F 12/0246 711/103 |
| 2001/0053091 A1* | 12/2001 | Futatsuya | G11C 7/06 365/185.11 |
| 2002/0007434 A1* | 1/2002 | Campardo | G06F 9/262 711/103 |
| 2002/0009081 A1* | 1/2002 | Sampath | H04L 12/462 370/389 |
| 2002/0078292 A1* | 6/2002 | Chilton | G06F 12/0866 710/305 |
| 2002/0078302 A1* | 6/2002 | Favor | G06F 12/0857 711/133 |
| 2002/0087778 A1* | 7/2002 | Schoinas | G06F 12/082 711/1 |
| 2002/0087815 A1* | 7/2002 | Arimilli | G06F 9/3004 711/155 |
| 2003/0005223 A1* | 1/2003 | Coulson | G06F 9/4401 711/118 |
| 2003/0014596 A1* | 1/2003 | Irie | G06F 12/0862 711/133 |
| 2003/0023827 A1* | 1/2003 | Palanca | G06F 12/123 711/173 |
| 2004/0064643 A1* | 4/2004 | Jamil | G06F 12/0831 711/118 |
| 2005/0182906 A1* | 8/2005 | Chatterjee | G06F 11/201 711/144 |
| 2006/0200634 A1* | 9/2006 | Yoshida | G06F 3/0617 711/148 |
| 2006/0259733 A1* | 11/2006 | Yamazaki | G06F 9/5016 711/173 |
| 2007/0030734 A1* | 2/2007 | Sinclair | G06F 3/0605 365/185.11 |
| 2007/0057957 A1* | 3/2007 | Wooten | G06F 12/1009 345/566 |
| 2008/0005465 A1* | 1/2008 | Matthews | G06F 3/0619 711/113 |
| 2008/0005471 A1* | 1/2008 | Ma | G06F 12/0246 711/115 |
| 2008/0162796 A1* | 7/2008 | Chang | G06F 12/0246 711/103 |
| 2008/0195801 A1* | 8/2008 | Cheon | G06F 12/0246 711/103 |
| 2008/0320214 A1* | 12/2008 | Ma | G06F 3/0613 711/103 |
| 2009/0089490 A1* | 4/2009 | Ozawa | G06F 12/0246 711/103 |
| 2009/0248958 A1* | 10/2009 | Tzeng | G06F 12/08 711/103 |
| 2009/0248959 A1* | 10/2009 | Tzeng | G06F 12/08 711/103 |
| 2009/0300294 A1* | 12/2009 | Moyer | G06F 9/3824 711/144 |
| 2009/0313416 A1* | 12/2009 | Nation | G06F 12/0638 711/100 |
| 2010/0030946 A1* | 2/2010 | Kano | G06F 3/0608 711/103 |
| 2010/0262765 A1* | 10/2010 | Cheon | G06F 3/0613 711/103 |
| 2011/0072199 A1* | 3/2011 | Reiter | G06F 13/14 711/103 |
| 2011/0231598 A1* | 9/2011 | Hatsuda | G06F 12/0804 711/103 |
| 2011/0296089 A1* | 12/2011 | Seol | G06F 12/121 711/103 |
| 2012/0047320 A1* | 2/2012 | Yoo | G06F 3/0616 711/103 |
| 2012/0198128 A1* | 8/2012 | Van Aken | G06F 12/0246 711/103 |
| 2012/0198174 A1* | 8/2012 | Nellans | G06F 12/0804 711/133 |
| 2012/0210041 A1* | 8/2012 | Flynn | G06F 1/183 711/3 |
| 2013/0179627 A1* | 7/2013 | Yeh | G06F 3/0656 711/103 |
| 2013/0219131 A1* | 8/2013 | Alexandron | G06F 12/02 711/154 |
| 2013/0318283 A1* | 11/2013 | Small | G06F 12/0246 711/103 |
| 2013/0332660 A1* | 12/2013 | Talagala | G06F 12/0246 711/103 |
| 2013/0346668 A1* | 12/2013 | Floman | G06F 9/5016 711/103 |
| 2014/0250272 A1* | 9/2014 | Hall | G06F 3/0611 711/118 |
| 2014/0281130 A1* | 9/2014 | Ellerbrock | G06F 12/0246 711/103 |
| 2014/0310574 A1* | 10/2014 | Yu | G06F 11/1072 714/773 |
| 2014/0325117 A1* | 10/2014 | Canepa | G06F 12/0246 711/103 |
| 2015/0227316 A1* | 8/2015 | Warfield | G06F 3/0608 711/103 |

\* cited by examiner

METHOD AND APPARATUS FOR PROVIDING DUAL MEMORY ACCESS TO NON-VOLATILE MEMORY

PRIORITY

This application claims the benefit of priority based upon U.S. Provisional Patent Application Ser. No. 61/846,519, filed on Jul. 15, 2013 in the name of the same inventor(s) and having a title of "Method and Apparatus for Providing Dual Support of Memory Mapped and Input/Output Mapped Logical Block Address Based Access," hereby incorporated into the present application by reference.

FIELD

The exemplary embodiment(s) of the present invention relates to digital computing systems. More specifically, the exemplary embodiment(s) of the present invention relates to non-volatile memory devices.

BACKGROUND

A solid state drive ("SSD") is a memory device capable of retaining data persistently without connecting to a power supply. The SSD uses various non-volatile memory devices such as NAND based flash memory or phase change memory to store data or digital information. With rapidly increasing storage capacity as well as access speed associated with non-volatile memory, SSD becomes more popular for storing non-volatile data in computing systems, such as laptop computers, desktop computers, mobile devices, tablets, servers, routers, network devices, and the like.

A conventional flash based SSD is organized and configured to replace or substitute traditional hard disk drive ("HDD") and use similar input and output ("I/O") access interface as traditional non-volatile storage drives. For example, HDD typically employs various types of I/O access interface, such as serial attached small computer system interface ("SAS"), serial ATA ("SATA") interface, to handle logical block address ("LBA") based storage access. Each block or sector of LBA, for example, can be configurable to have a storage capacity of 512 bytes.

To use similar HDD I/O access interface, conventional flash based SSD can be configured to have a block size of 4096 bytes or 4 kilobyte ("Kbyte") block. The flash memory typically has a minimum unit such as a block size for a read-or-write operation at a given time. In general, the speed for flash based SSD is typically faster than HDD.

SUMMARY

One embodiment of the present invention discloses a method and/or system to provide a dual memory access to a non-volatile memory device using expended memory addresses. The digital processing system such as a computer includes a non-volatile memory device, a peripheral bus, and a digital processing unit. The non-volatile memory device such as a solid state drive can store data persistently. The peripheral bus, which can be a peripheral component interconnect express ("PCIe") bus, is used to support dual memory access to the non-volatile memory device. The digital processing unit such as a central processing unit ("CPU") is capable of accessing storage space in the non-volatile memory device in accordance with an extended memory address and/or offset.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
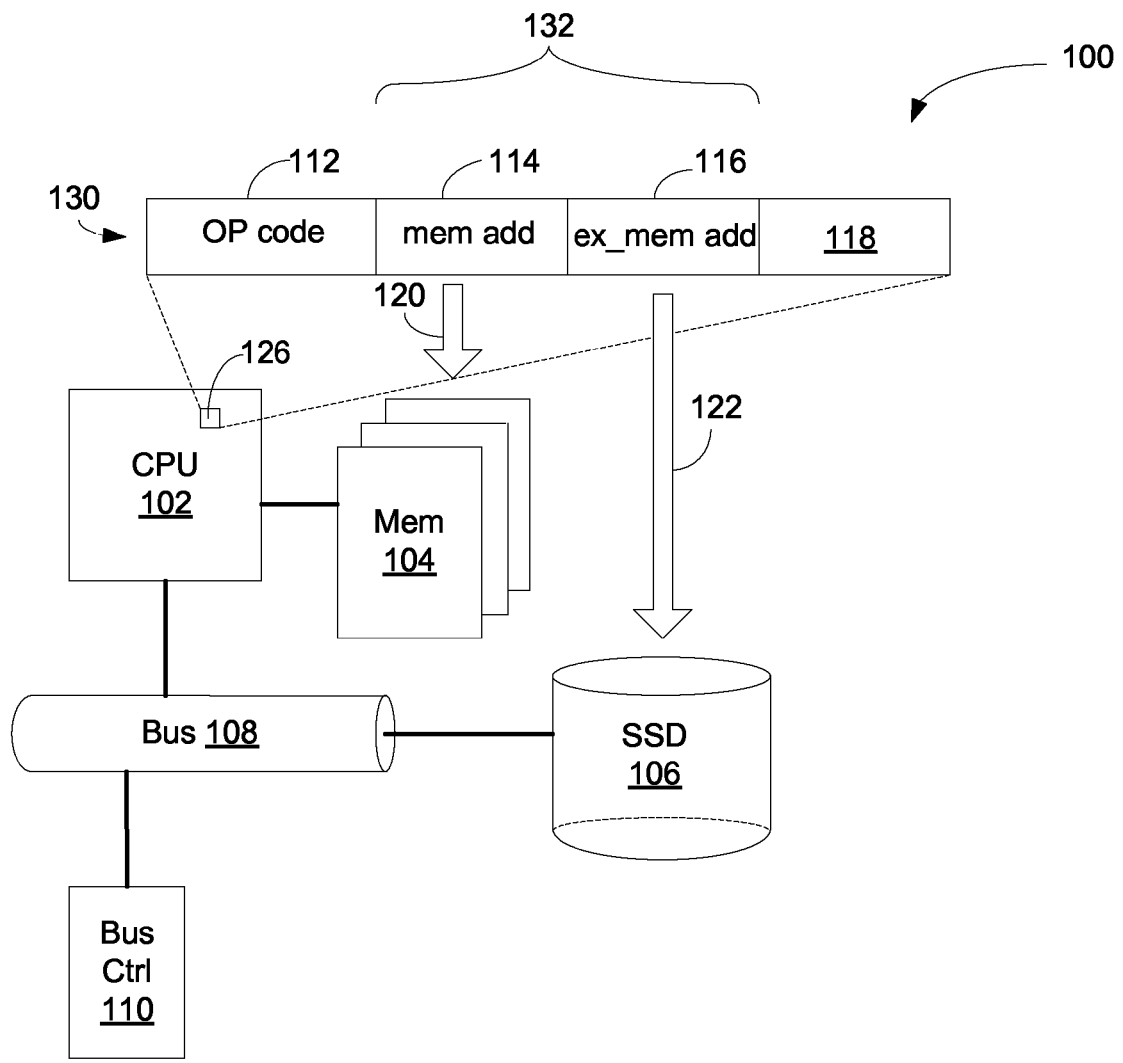
FIG. 1 is a block diagram illustrating a computer system configured to provide dual memory access to SSD in accordance with one embodiment of the present invention.

Embodiments of the present invention are described herein with context of a method and/or apparatus for enabling a digital processing unit to directly access memory space in a solid state drive ("SDD").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses a digital processing system which can be a computer, server, or network router capable of providing a dual memory access to a non-volatile memory device using expended memory addresses. The digital processing system includes a non-volatile memory device, a peripheral bus, and a digital processing unit. The non-volatile memory device such as a SSD can store data persistently. The peripheral bus, which can be a peripheral component interconnect express ("PCIe") bus, is used to support memory access to the non-volatile memory device. The digital processing unit such as a central processing unit ("CPU") is capable of accessing storage space in the non-volatile memory device in accordance with an extended memory address and/or offset.

FIG. 1 is a block diagram 100 illustrating a computer system configured to provide dual memory access to SSD 106 via a peripheral bus 108 in accordance with one embodiment of the present invention. Diagram 100 illustrates a non-volatile ("NV") memory device or SSD 106, a peripheral bus 108, a digital processing unit or CPU 102, a bus controller 110, and a memory 104. It should be noted that the underlying concept of the exemplary embodiment(s) of the present invention would not change if one or more blocks (or devices) were added to or removed from diagram 100.

NV memory device or SSD 106 is able to store data or information persistently without connecting to an electrical power supply. The NV memory, for example, can be flash memory, phase-change memory, or magnetoresistive random-access memory ("MRAM"). NV memory device 106, in one embodiment, is flash memory based SSD.

The flash memory based SSD, for example, includes multiple arrays of NAND based flash memory cells for storage. The flash memory, which generally has a read latency less than 100 microseconds ("μs"), is organized in a block device wherein a minimum access unit may be set to either four (4) Kbyte, eight (8) Kbyte, or sixteen (16) Kbyte memory capacity depending on the flash memory technology. Other types of NV memory, such as phase change memory ("PCM"), magnetic RAM ("MRAM"), STT-MRAM, or ReRAM, can also be used. As NV memory evolves such as ReRAM, byte addressable NV memory such as PCM or MRAM (Magnetic RAM) are available for storage and access. To simplify the forgoing discussion, the flash memory or flash based SSD is herein used as an exemplary NV memory for dual memory access.

Peripheral bus 108 which couples to the NV memory device is configured to facilitate memory access to SSD 106 based on extended memory address. In one embodiment, peripheral bus 108 is a peripheral component interconnect express ("PCIe") bus which is capable of facilitating memory access to SSD 106 using memory addresses such as an address for a word or a byte. Word size, for example, can be one (1) byte, two (2) bytes, four (4) bytes, and/or sixteen (16) bytes.

CPU or central processing unit 102 is a microprocessor, processor, or controller capable of executing computing instructions to carryout various operations. To simplify forgoing discussion, CPU will be used to refer to central processing unit, microprocessor, processor, microcontroller, digital signal processing component, and the like. CPU 102, in one embodiment, is configured to directly access at least a portion of the storage space in SSD 106 in accordance with a set of extended memory address and/or offset. For example, CPU 102 uses a set of predefined extended memory address to access a section of SDD as storage class memory ("SCM"). To improve access latency, a buffering mechanism and/or a pre-fetch operation can be implemented to mitigate accessing speed relating to NV memory.

Memory 104, in one example, is a dynamic random access memory ("DRAM") that stores information such as instructions, programs, and data for speedy memory access. Memory 104 generally provides fast turn-around time. The information stored in memory 104 is usually volatile, and the stored information disappears as soon as memory 104 disconnects from power.

The computer system further includes an architecture of cache scheme such as level 1 ("L1"), L2, L3, and/or unique cache or buffer memories. A dedicated cache memory, in one embodiment, is assigned to implement SCM for reducing access latency. For example, a unique caching scheme for dual mode access can be developed based on types of NV memory used. Depending on the applications, the cache scheme which is also referred to as buffers can be at L1, L2, L3, or specially allocated memory space. A buffer, in one example, can buffer or temporarily store digital information between peripheral bus 108 and CPU 102.

Bus controller 110, also known as bus interface, is coupled with peripheral bus 108 for facilitating and/or assisting functions relating to dual memory access. Note that a function of dual memory access is to provide direct memory access to the NV memory device. Another function of dual memory access is to provide a function of I/O storage capable of accessing SSD 106 as an I/O device. In one embodiment, bus controller 110 is configured to work in conjunction with CPU 102 and bus 108 to provide functions of the dual memory access to SSD 106.

In operation, when an instruction 130 is fetched from instruction set 126, CPU 102 identifies various fields such as fields for operation code ("op code") 112 and memory address 132. Memory address 132, in one embodiment, includes memory addresses 114 and extended memory addresses 116. It should be noted that instruction 130 may include other fields 118 which may include offset and/or other addresses. CPU 102, in one embodiment, is able to access memory 104 using direct memory address 114 as indicated by arrow 120, and access SSD 106 using extended memory address 116 as indicated by arrow 122.

An advantage of using the dual memory access is that it allows a processor to directly access at least a portion of the memory space in SSD.

Figure 2A:
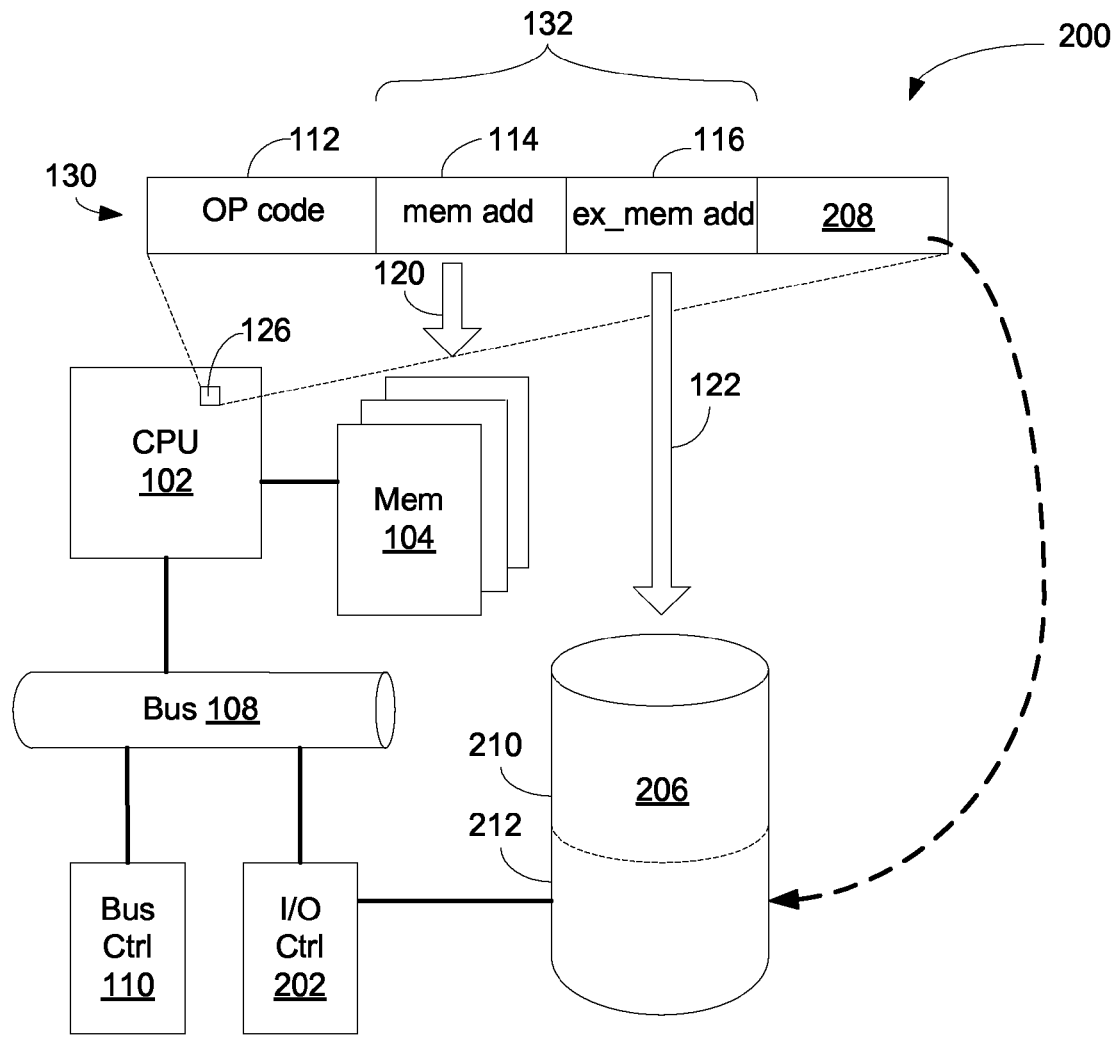
FIGS. 2A-B are block diagrams illustrating exemplary systems able to implement dual memory access via a bus in accordance with one embodiment of the present invention.

FIG. 2A is a block diagram 200 illustrating an exemplary system that is able to provide dual memory access to SSD via bus 108 in accordance with one embodiment of the present invention. Diagram 200 illustrates a digital processing system including SSD 206, peripheral bus 108, CPU 102, bus controller 110, I/O controller 202, and memory 104. Diagram 200 is similar to diagram 100 except that SSD 206 is partitioned. In one embodiment, SSD 206 allocates a memory portion 210 that can be accessed by direct memory access or direct memory map as indicated by arrow 122. SSD 206 also includes a second section 212 for I/O storage. SSD 206 is coupled to I/O controller 202 for managing I/O access.

During an operation, the system can access memory portion 210 according to extended memory address 116. CPU 102 can also access I/O storage 212 of SSD 206 using virtual address 208 via I/O controller 202. It should be noted that a unique cache, not shown in FIG. 2A, can be situated between CPU 102 and memory portion 210 for enhancing efficiency of NV memory access. In one embodiment, I/O controller 202 is configured to provide both memory access and I/O access in view of bus configuration.

To support dual memory access, a bus interface switch such as PCIe is used to map memory access to I/O mapped device. For memory access such as read modify write, memory address associated with PCIe, for example, may be configured and mapped to I/O LBA address(es). Note that write cache (or buffer) and/or read buffer (or cache) may be used for memory access. To reduce access latency, read cache and/or special pre-fetch mechanism may be implemented to enhance overall system performance.

It should be noted that with evolution of NV memory technology, the read and write latency of NV memory has been improved. To benefit the improvement of access speed associated with the NV memory, CPU 102 can directly access at least a portion of the NV memory (or SSD 210) as a memory instead of an I/O device. To map memory address to LBA of SSD, PCIe bus 108 is able to handle such memory map in SSD 206 through I/O controller. It should be noted that peripheral bus 108 such as PCIe supports both memory access and I/O access.

SSD 206 or other NV memory based storage, in one example, can be located or attached to a PCIe bus interface or a host memory interface that supports memory based addressing and I/O block level driver access. The address scheme of memory space and the I/O block level scheme can be determined from the following equation, Memory address=LBA*Block size+offset address in the block.

If, for example, the block size equals to 4 KByte and offset is 356 in second LBA, Memory address can be identified with 1*4096+356=4452 Byte. LBA can be derived from the following equation, $$LBA=INT(Memory\ address/LBA\ size)$$

Where INT is the integer function. Offset=MOD (Memory address/LBA size) where MOD is the modular function.

Figure 2B:
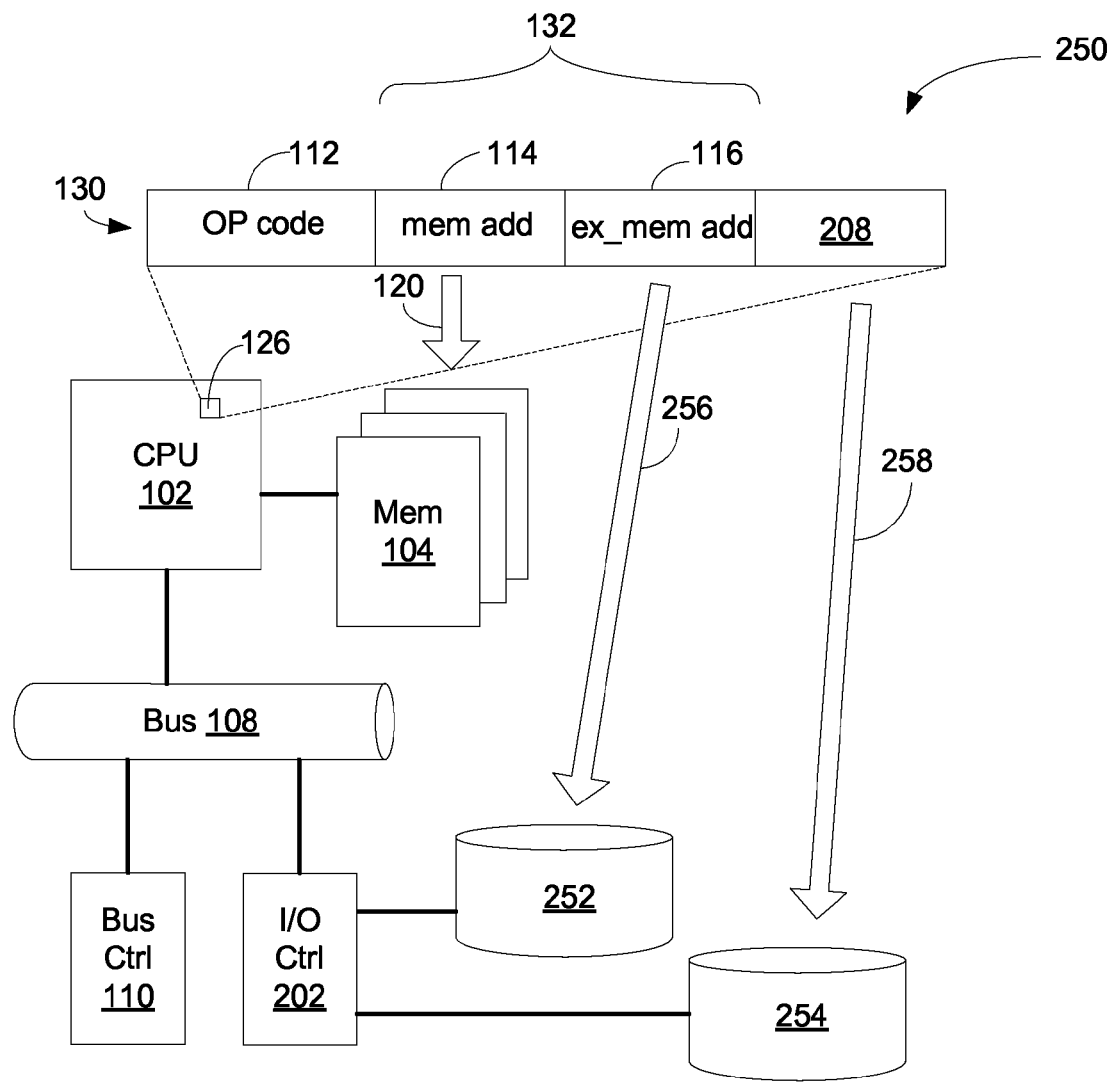

FIG. 2B is a block diagram 250 illustrating an alternative exemplary system capable of providing dual memory access in accordance with one embodiment of the present invention. Diagram 250 illustrates a digital processing system including SSDs 252-254, peripheral bus 108, CPU 102, bus controller 110, I/O controller 202, and memory 104. Diagram 250 is similar to diagram 200 except that two (2) SSDs 252-254 are used in the system. In one aspect, SSD 252 is dedicated to direct memory access via memory map. SSD 254 is used for I/O storage which can be accessed as an I/O device via I/O controller 202. It should be noted that duel mapping provides compatibility of conventional NV memory drives such as SSD, HDD, magnetic types, and/or optical drive via I/O access or traditional direct memory access.

An advantage of using the dual memory access is that it can be effective for big data application because dual memory access allows CPU to have more control over SSD. For example, when large database is stored in SSD, SCM can be used to provide direct memory access to SSD. It should be noted that with improvement of NV memory technology such as PCM or ReRAM, the read and write memory access can have finer granularity such as byte access or word access. To facilitate memory access with finer granularity, PCIe memory space access can be used by SCM.

Figure 3:
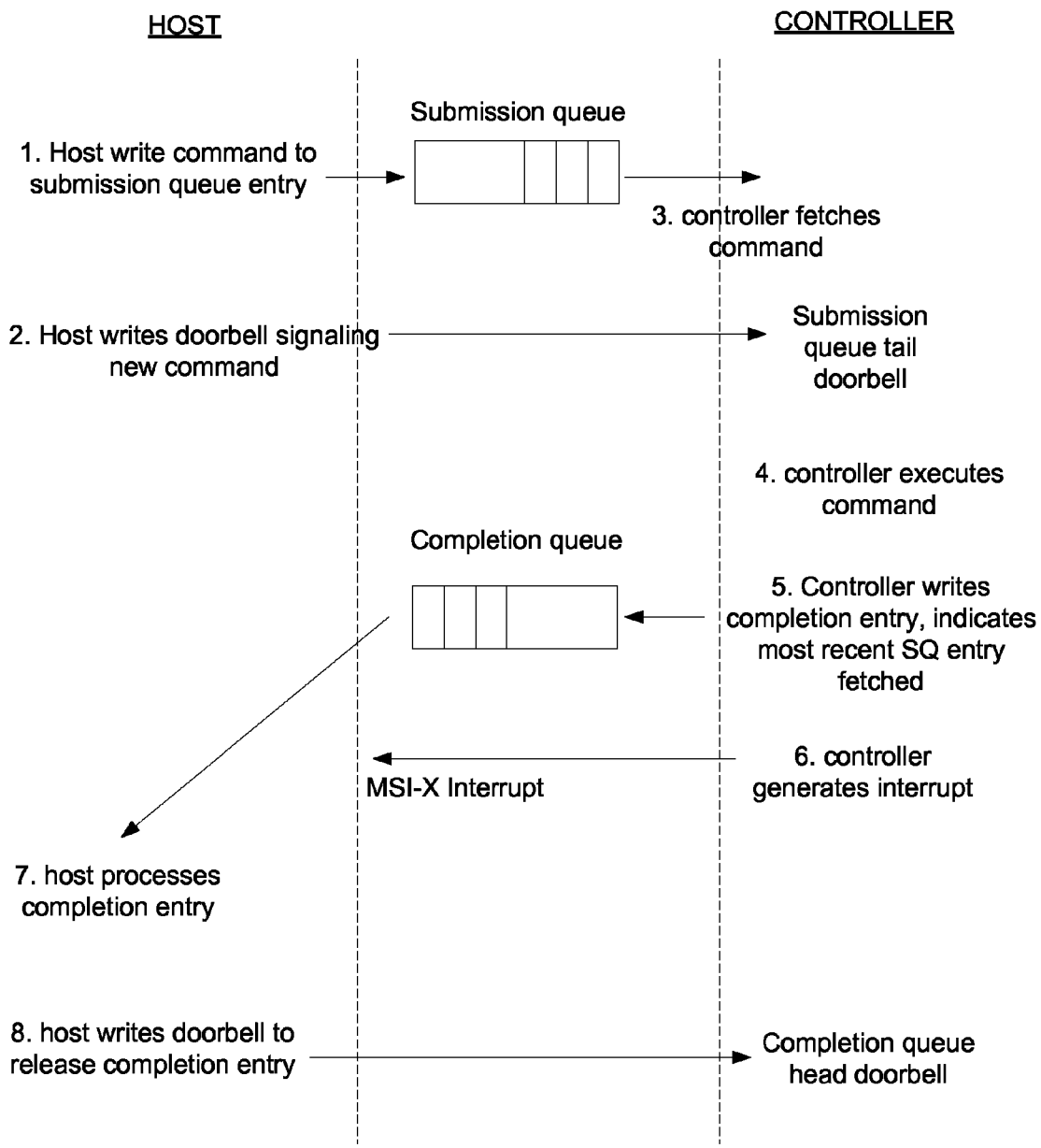
FIG. 3 is a logic flow diagram illustrating an interface between a host and a SSD controller in accordance with one embodiment of the present invention.

FIG. 3 is a logic flow diagram illustrating an interface between a host and a SSD controller in accordance with one embodiment of the present invention. The interface can be defined or specified according to a standard interface specification such as NV memory express ("NVMe") for implementing one embodiment of dual memory access. NVMe, as an exemplary standard, is a register level interface that allows host software to communicate with a NV memory subsystem such as SSD. The interface provides optimization between enterprise and client SSDs connected by PCIe interface. It should be noted that the interface for facilitating memory access may use block based concept such as LBA for SSD access. To simplify forgoing discussion, NVMe is used as an exemplary interface standard. It should be noted that other similar standard will also work for SSD dual memory access.

According to NVMe, various steps are generally required to complete data or information exchange between a host and a controller of NV memory. In step 1, the host issues a write command which is submitted and queued at a submission queue. After sending a doorbell signal by the host indicating a new command at step 2, the controller, at step 3, fetches the write command from the submission queue. After executing the write command at step 4, the controller, at step 5, writes completing information which is queued at a completion queue. The completing information may indicate the most recent sequential queue ("SQ") that has been fetched. After receiving an interrupt signal or message-signaled interrupt ("MSI") from the controller, the host obtains and processes the completion entry at step 7. The host subsequently writes a doorbell to release the completion entry at step 8.

Figure 4A:
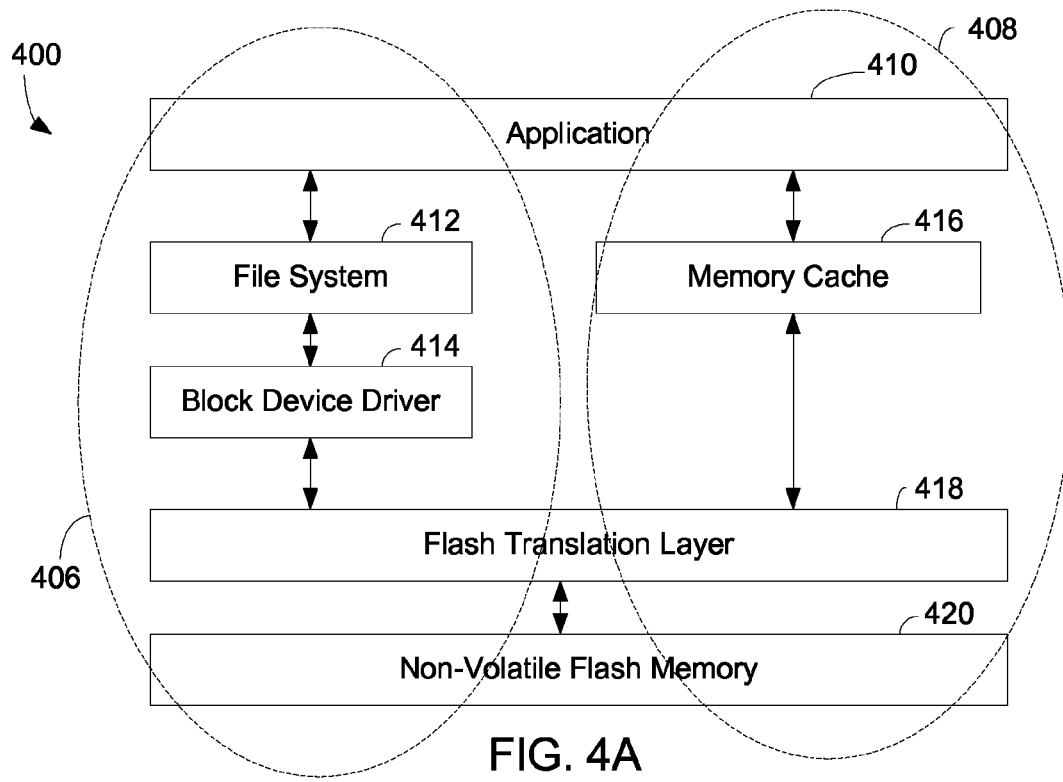
FIGS. 4A-B are logic flows illustrating a dual memory operation showing a direct memory access and an I/O access to a SSD in accordance with one embodiment of the present invention.

FIG. 4A is a logic flow 400 illustrating a dual memory operation showing a direct memory access and an I/O access to a SSD in accordance with one embodiment of the present invention. Logic flow 400 includes an I/O access flow 406 and a memory access flow 408. It should be noted that the underlying concept of the exemplary embodiment(s) of the present invention would not change if one or more layers (or blocks) were added to or removed from flow 400.

During execution of application 410, a logic flow 406 is followed when the system issues a command for I/O storage operation. Alternatively, a logic flow 408 is executed when the system issues a direct memory access to NV memory

420. For logic flow 406, file system 412 is used to handle communication between application executed by CPU and block device driver 414. In one example, block device driver 414 is NV memory dependent. Block device driver 414 may reside at the I/O interface or I/O controller. A translation layer 418 such as flash translation layer ("FTL"), in one aspect, is used to facilitate communication between block device driver 414 and NV flash memory 420. Note that FTL 418 maps LBAs to physical addresses.

To simplify implementation of NV memory operation, FTL 418 provides an interface mapping between logical addresses and physical addresses. A function of FTL 418 is to translate between LBA and physical page address ("PPA"). PPA addressed by LBA, in one embodiment, points to a page in a flash memory. Depending on the applications, PPA may also be configured to point to a sector or a portion of a page in a flash memory.

SSD or NV flash memory 420, in one example, is handled by software or hardware as I/O device controlled by block device driver 414. The hardware adds FTL 418 to translate LBA to PPA or vice verse. In some instances, storage access to SSD via I/O access is mapped through virtual paging mechanism.

Memory access flow 408, in one aspect, illustrates a direct memory access to NV flash memory 420 via a memory cache or buffer 416. It should be noted that LBA and memory address translation are implemented in dual mapping mode. An advantage of providing a dual mapping mode or dual memory access which includes I/O device and direct memory access is that the dual module continues to support the traditional I/O access model such using NVM express protocol. Also, SSD has a memory address space that can be accessed by CPU for storing information.

Figure 4B:
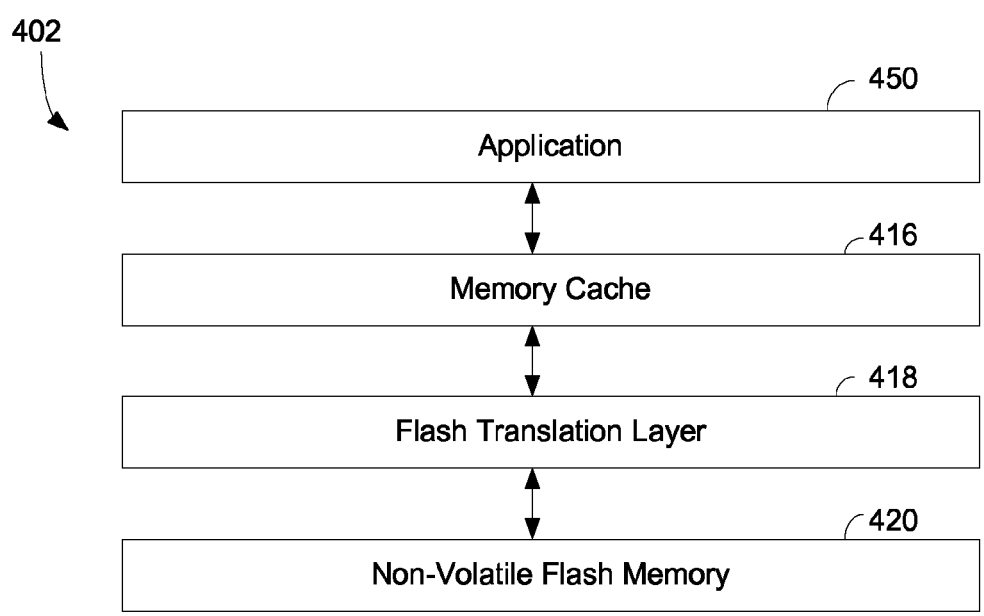

FIG. 4B is a logic flow 402 illustrating a dual memory operation showing a direct memory access to SSD in accordance with one embodiment of the present invention. Flow 402 is similar to flow 408 shown in FIG. 4A except that flow 402 show a direct memory access portion of the logic sequence. In one embodiment, when an application 450 is executed, application 450 is able to access data or information stored in NV memory 420 via memory cache 416 and FTL 418. It should be noted that cache 416 is a special dedicated buffer or a group of buffers configured to handle various read-write and/or pre-fetch operations.

Figure 5:
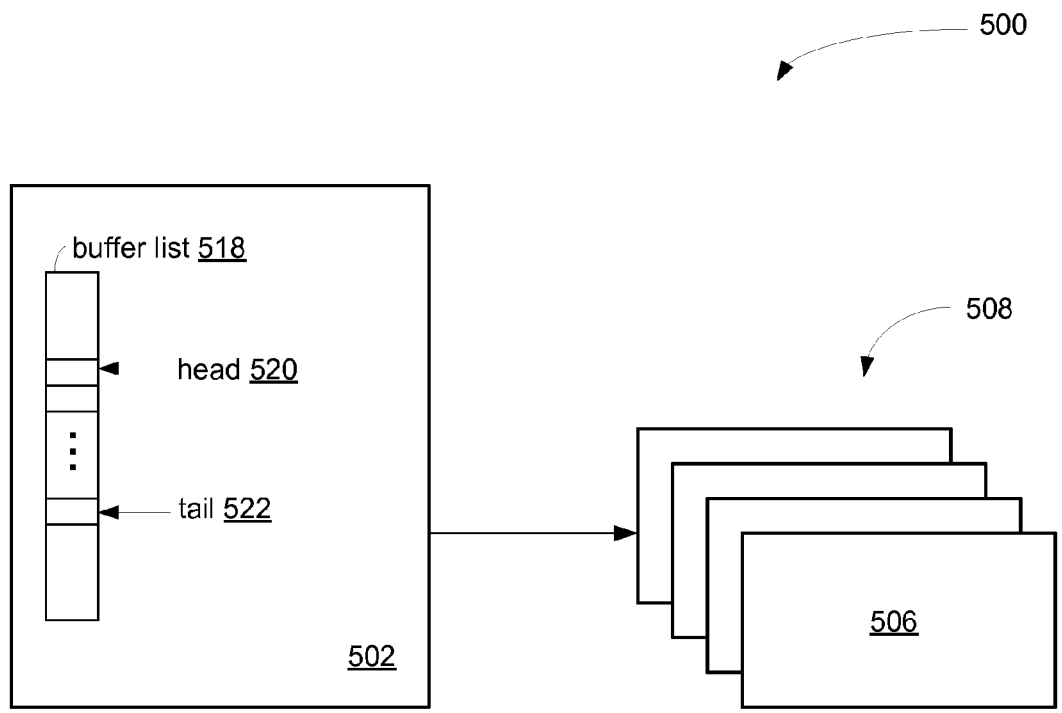
FIG. 5 is a block diagram illustrating a configuration of write memory cache used for dual memory operation in accordance with one embodiment of the present invention.

FIG. 5 is a block diagram 500 illustrating a configuration of write memory cache used for dual memory access in accordance with one embodiment of the present invention. Diagram 500 includes a cache 502 and multiple buffers 508 wherein cache 502 includes at least one buffer list 518. Buffer list 518, in one example, includes a head pointer 520 and a tail pointer 522. Pointers 520-522 indicate used buffers as well as free buffers. The terms "buffer" and "cache", which can be used interchangeably, refer to a small block of volatile memory or DRAM. It should be noted that the underlying concept of the exemplary embodiment(s) of the present invention would not change if one or more blocks (or devices) were added to or removed from diagram 500.

Cache 502, in one example, includes 4 KByte memory space used for buffer unit map. A function of memory cache is to reduce the write latency by supporting write back cache mode. Buffers 506 are actual buffers where the content of each buffer will be stored in SSD when it is ready to be stored. The cache or buffer, in one example, is used to absorb the delay during a write-to-memory operation. Before writing to a block of SSD, data or information to be written is gathered in a buffer or written to a buffer first. When the buffer is full or almost full, the content of buffer is rewritten to SSD.

Memory cache 502-506 can also be used as read cache or buffer in which the read access latency during SSD read operation can be reduced. Cache 502-506 can also be used to support pre-fetch operation in which potential data or information is preloaded from the NV memory (or SSD) to buffer 506.

An advantage of using buffers or cache is that buffering data transmission between CPU and SSD can mitigate access latency.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 6:
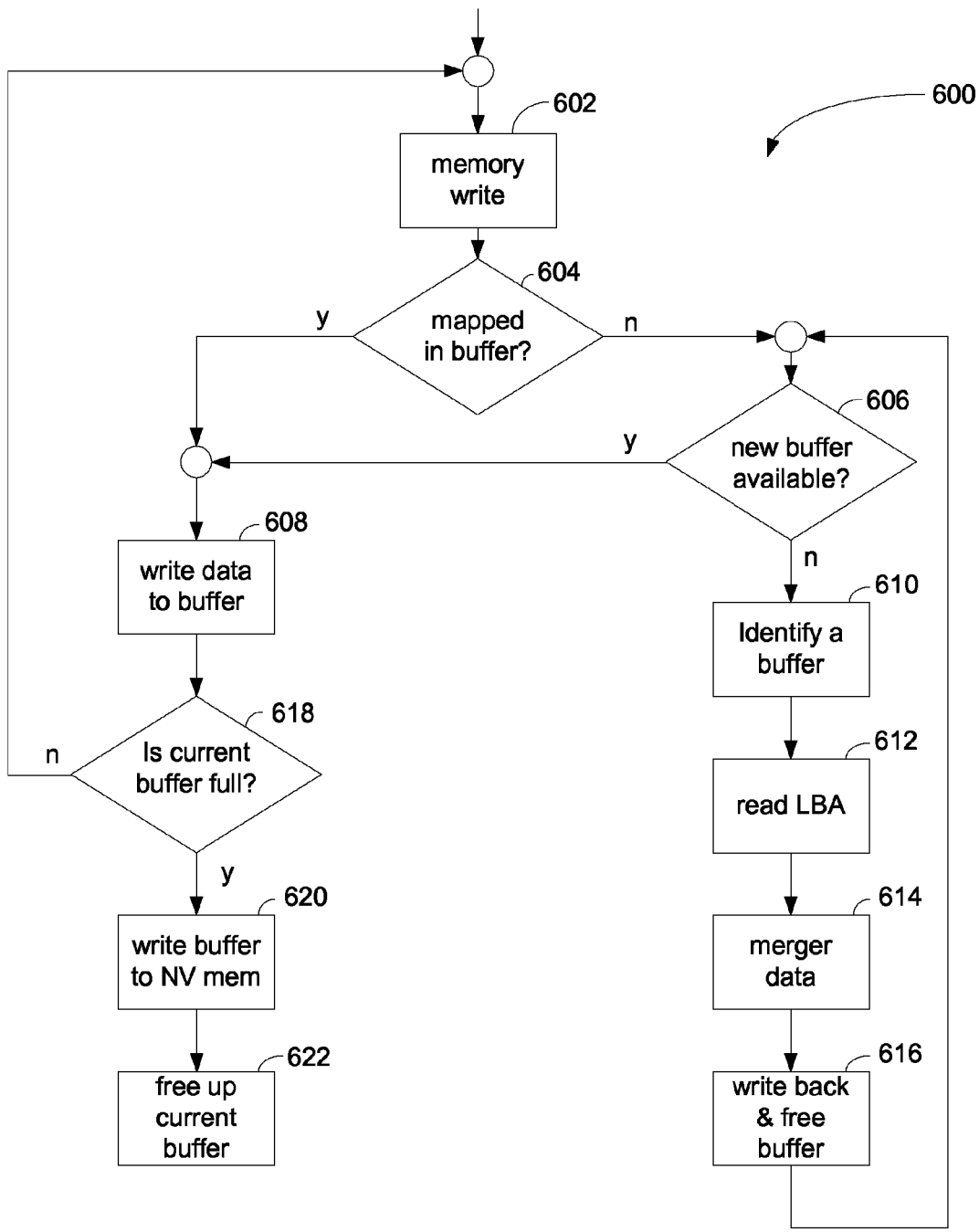
FIG. 6 is a flow diagram illustrating a write operation for a dual memory access in accordance with one embodiment of the present invention.

FIG. 6 is a flow diagram 600 illustrating a write process for a dual memory access in accordance with one embodiment of the present invention. At block 602, a memory write operation is issued. For example, a memory access by a central processing unit or CPU for writing information is issued to a first storage location addressed by an expanded memory address. Based on the expanded memory address, a controller is able to identify that the first storage location is in SSD. The process, at block 604, examines the buffer list to see whether the expanded memory address is in a buffer. If the buffer is not found or absent from the buffer list, the process proceeds to block 606 to check whether a new buffer or free buffer is available. If a new buffer is available, the process proceeds to block 608. Otherwise, the process proceeds to block 610.

At block 610, a buffer is identified or picked as a new buffer based on a predefined buffer identifying procedure or mechanism. At block 612, the content from a block pointed by a LBA associated with the new buffer is read. After merging the content or block content with the content currently in the identified buffer as new buffer at block 614, the merged content is written or rewritten back to the NV memory at block 616. A free buffer signal indicating available new buffer or free buffer is sent. The process subsequently goes to block 606.

If the buffer is found in the buffer list at block 604, the process proceeds to block 608 and the information is written to the buffer. At block 618, if the buffer is not full, the process loops back to block 602 to process the next write operation. Otherwise, the process proceeds to block 620 and transmits the information or content from the cache to the first storage location of the flash memory SSD. At block 622, the buffer is free after the content is written to SSD.

The process is also able to issue an I/O access to an I/O controller for writing data to a second storage location in the flash memory based SSD. Note that the data is stored to a second location of the flash memory SSD in accordance with an LBA. The second location of SSD is assigned for handling I/O access. It should be noted that a FTL is used to communicate between CPU and SSD.

Depending on the applications, different mechanisms of buffer reuse, renew, or deletion can be applied. For example, when a write-cache or buffer is getting full, either an earliest written buffer or the least frequently written buffer is written to NV memory. Before writing to the NV memory, the same 4 KByte of data from the NV memory is first read and subsequently merged with the content of the buffer. After merging, the buffer is free once the merged data is written to the NV memory. It should be noted that different criteria to choose which 4. Kbyte of buffer to be freed or updated depends on the applications.

Also, a least frequently write-hit buffer or cache can also be used as alternative criteria to choose a buffer to be cleared.

Figure 7:
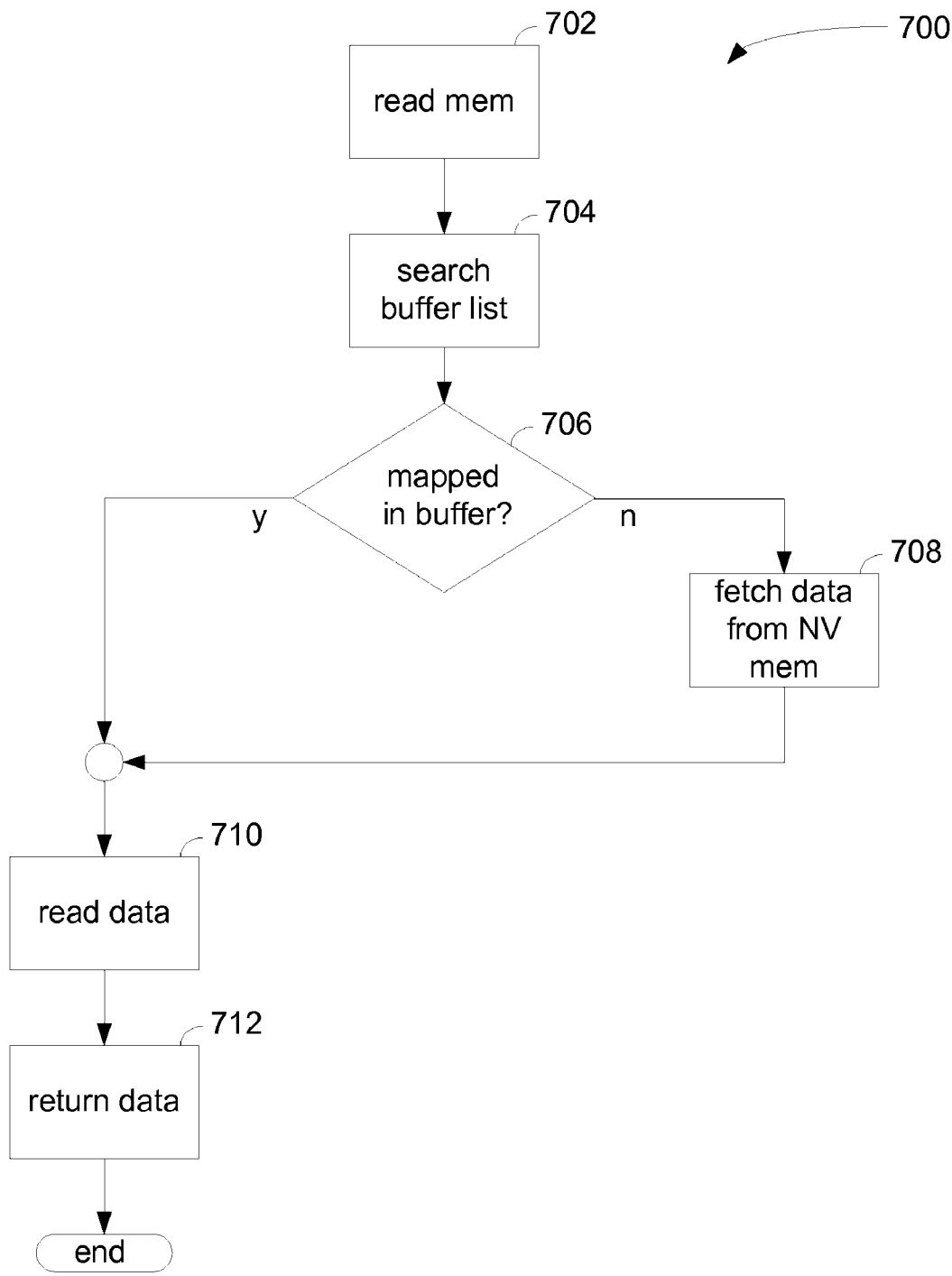
FIG. 7 is a flow diagram illustrating a read operation performed by a process able to provide a dual memory access in accordance with one embodiment of the present invention.

FIG. 7 is a flow diagram 700 illustrating a read operation performed by a process able to provide a dual memory access in accordance with one embodiment of the present invention. During a read operation, a buffer or read memory cache is used to enhance efficiency of SSD read. At block 702, when a memory read is applied from a host CPU, the associated memory address is converted to the LBA according to page or block size. At block 704, a process searches the buffer list to examine whether the requested content addressed by the memory address already exists in the buffer list. At block 706, if the requested content addressed by the memory address is not in the buffer list, the content of the buffer addressed by the memory address is read from the NV memory at block 708. The process subsequently proceeds to block 710.

At block 706, if the memory address matches with one of buffer's LBA on the buffer list, the content of buffer is read from the cache buffer at block 710. At block 712, the read data is returned to the host CPU. The read operation is subsequently ended. It should be noted that the underlying concept of the embodiment(s) of read operation should not change if some steps and/or sequences are inserted, replaced, and/or removed.

Figure 8:
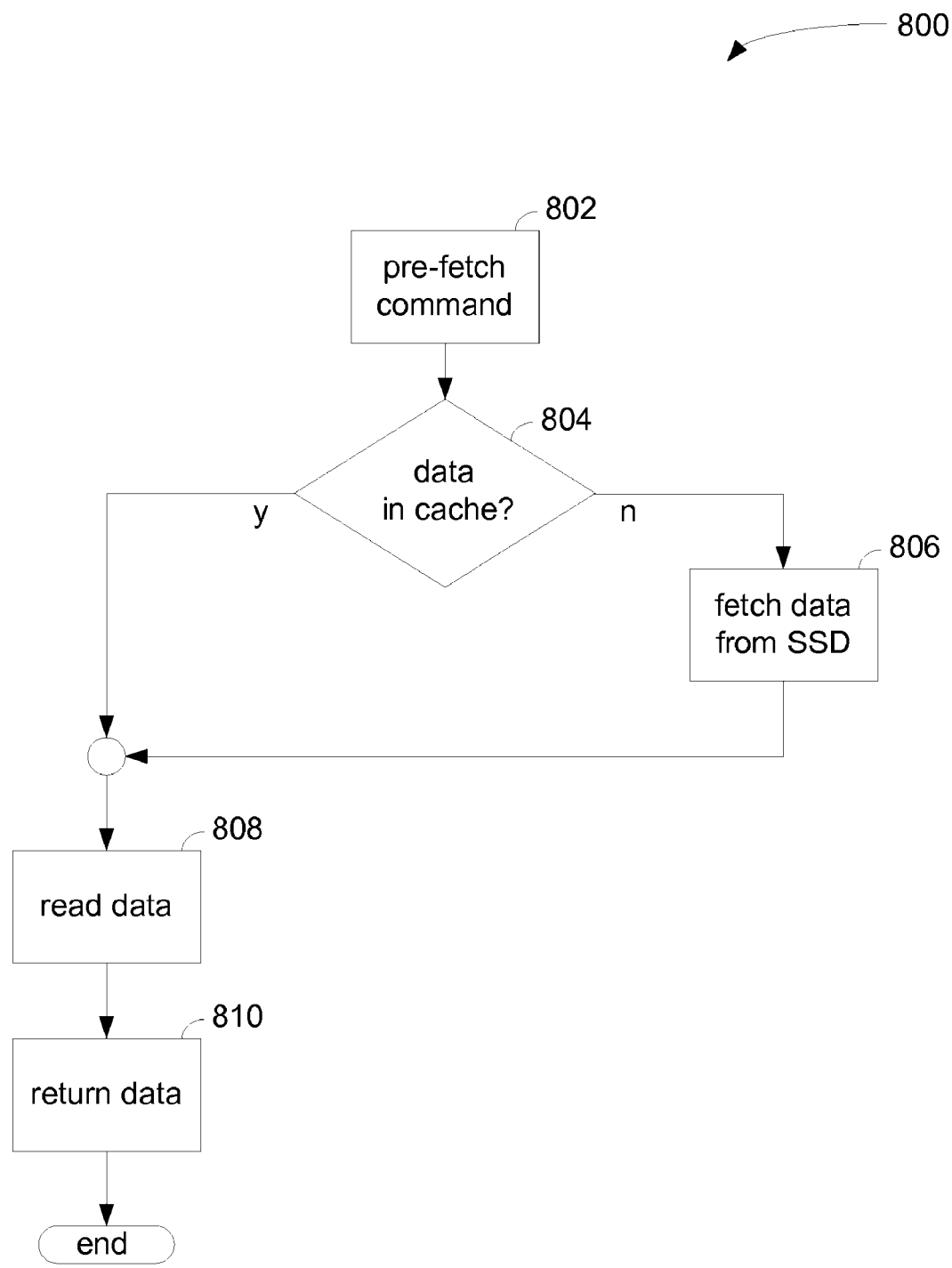
FIG. 8 is a flowchart illustrating a pre-fetch operation performed by a process which is able to provide a dual memory access in accordance with one embodiment of the present invention.

FIG. 8 is a flowchart 800 illustrating a pre-fetch operation performed by a process which is able to provide a dual memory access in accordance with one embodiment of the present invention. Since NV memory generally has larger access latency than DRAM, a pre-fetch operation is implemented to shorten such latency. In one embodiment, a pre-fetch mechanism is implemented by software using the corresponding buffer or cache scheme. Once data is pre-fetched, the host CPU can read the data from the corresponding buffer. At block 802, a process issues a pre-fetch command. For example, a special local cache command issues a pre-fetch or read a portion of SSD based on identified LBAs. At block 804, the process checks to see if the data to be pre-fetched is already in the cache or buffer. If the data to be pre-fetched is not in the buffer, the process activates SSD controller to read the data from SSD to the buffer at block 806. The process proceeds to block 808.

At block 808, if the data to be pre-fetched is in the buffer, the process proceeds to read the data from the buffer as indicated by the memory address. At block 810, the process returns the read data to the host CPU as it requested earlier. The pre-fetch operation subsequently ends.

A pre-fetch command, for example, can be defined based on vendor specific command field. The pre-fetch command allows software driver to automatically issue pre-fetch command based on user's preference. Upon receipt of a pre-fetch command, SSD controller proceeds to read LBA data to a DRAM buffer which will be ready for access by host.

Figure 9:
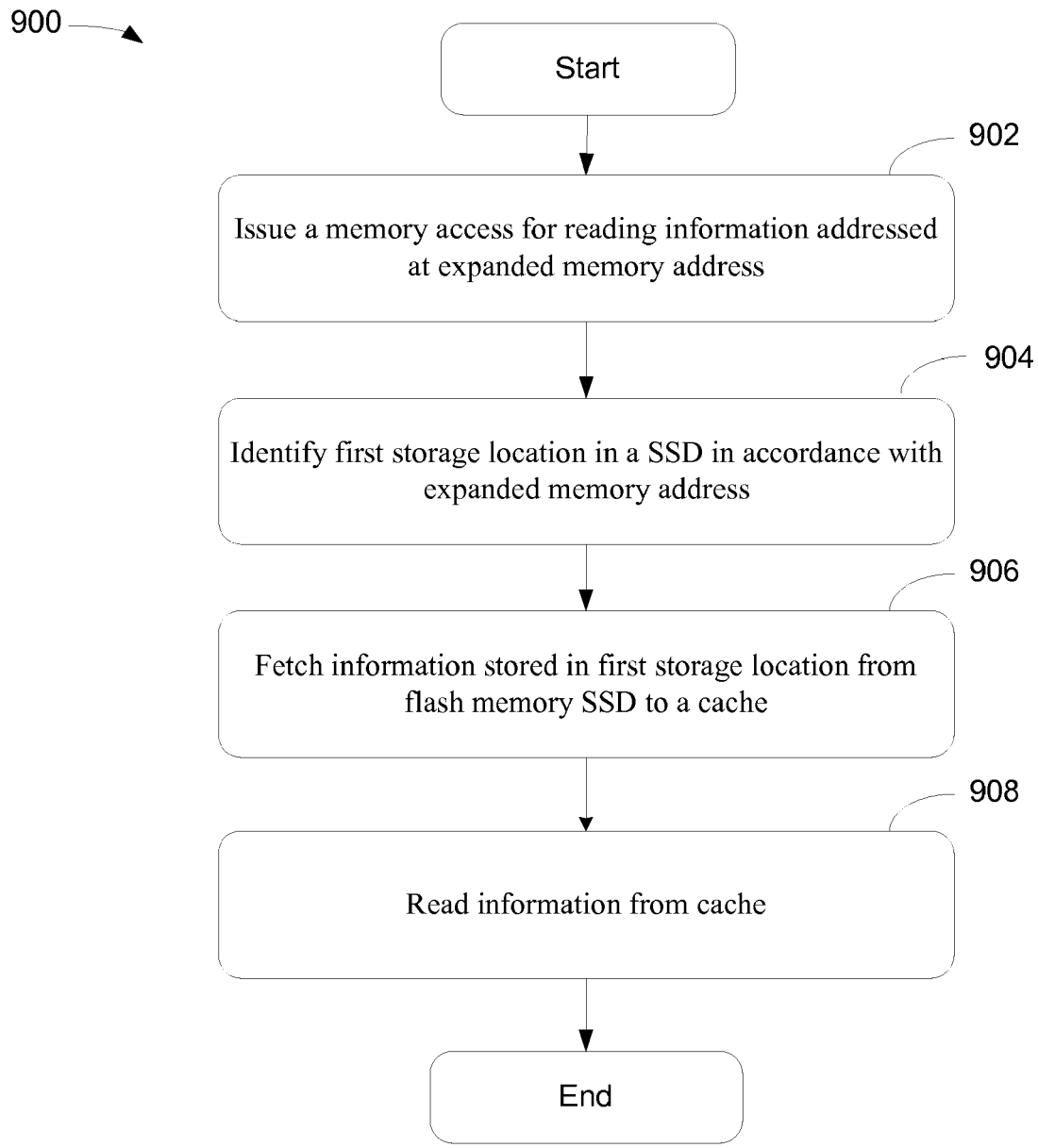
FIG. 9 is a flowchart illustrating a dual memory access to a SSD in accordance with one embodiment of the present invention.

FIG. 9 is a flowchart 900 illustrating a dual memory access to a SSD in accordance with one embodiment of the present invention. At block 902, a process capable of providing dual mode memory access issues a direct memory access by a central processing unit to read information stored at a first storage location addressed by an expanded memory address. In one embodiment, the range of expanded memory address can be substantially larger than DRAM memory address whereby the expended memory address is automatically mapped into SSD memory space. At block 904, upon identifying the first storage location in a flash memory SSD in accordance with the expanded memory address, the information stored in the first storage location is fetched from the flash memory SSD to a cache. In one example, a pre-fetch instruction or command to preload a portion of data from the flash memory SSD can be issued. Note that pre-fetch is to reduce memory access latency. At block 908, the information is read from the cache and forwarded to the host.

In one aspect, the process also issues an I/O access for reading data stored at a second storage location in the flash memory SSD. It should be noted that the data from the second location of the flash memory SSD is obtained in accordance with a logical block address ("LBA").

Figure 10:
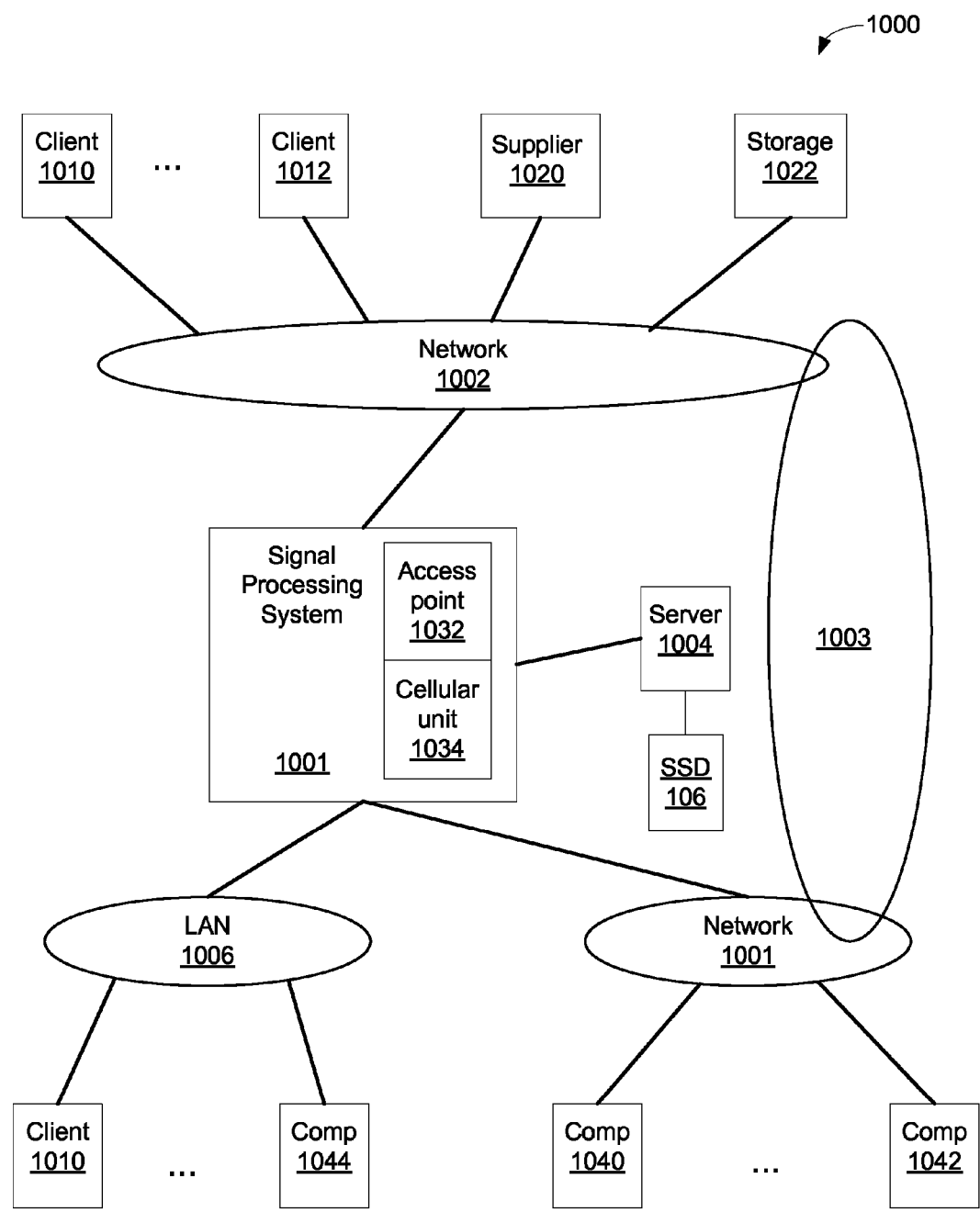
FIG. 10 is a diagram illustrating a computer network capable of providing network traffic routing between various users using a dual memory access in accordance with one embodiment of the present invention.

FIG. 10 is a diagram illustrating a computer network 1000 capable of providing network traffic routing between various users using a dual memory access in accordance with one embodiment of the present invention. In this network environment, electronic band 1001 can be coupled to a wide-area network 1002. Wide-area network 1002 includes the Internet, or other proprietary networks including America On-Line™, SBC, Microsoft Network™, and Prodigy™. Wide-area network 1002 may further include network backbones, long-haul telephone lines, Internet service providers, various levels of network routers, and other means for routing data between computers.

Server 1004 is coupled to wide-area network 1002 and is, in one aspect, used to route data to clients 1010-1012 through a local-area network ("LAN") 1006. Server 1004 is coupled to SSD 106 wherein server 1004 can be configured to provide dual memory access. The LAN connection allows client systems 1010-1012 to communicate with each other through LAN 1006. Using conventional network protocols, USB portable system 1030 may communicate through wide-area network 1002 to client computer systems 1010-1012, supplier system 1020 and storage device 1022. For example, client system 1010 is connected directly to wide-area network 1002 through direct or dial-up telephone or other network transmission lines. Alternatively, clients 1010-1012 may be connected through wide-area network 1002 using a modem pool.

Figure 11:
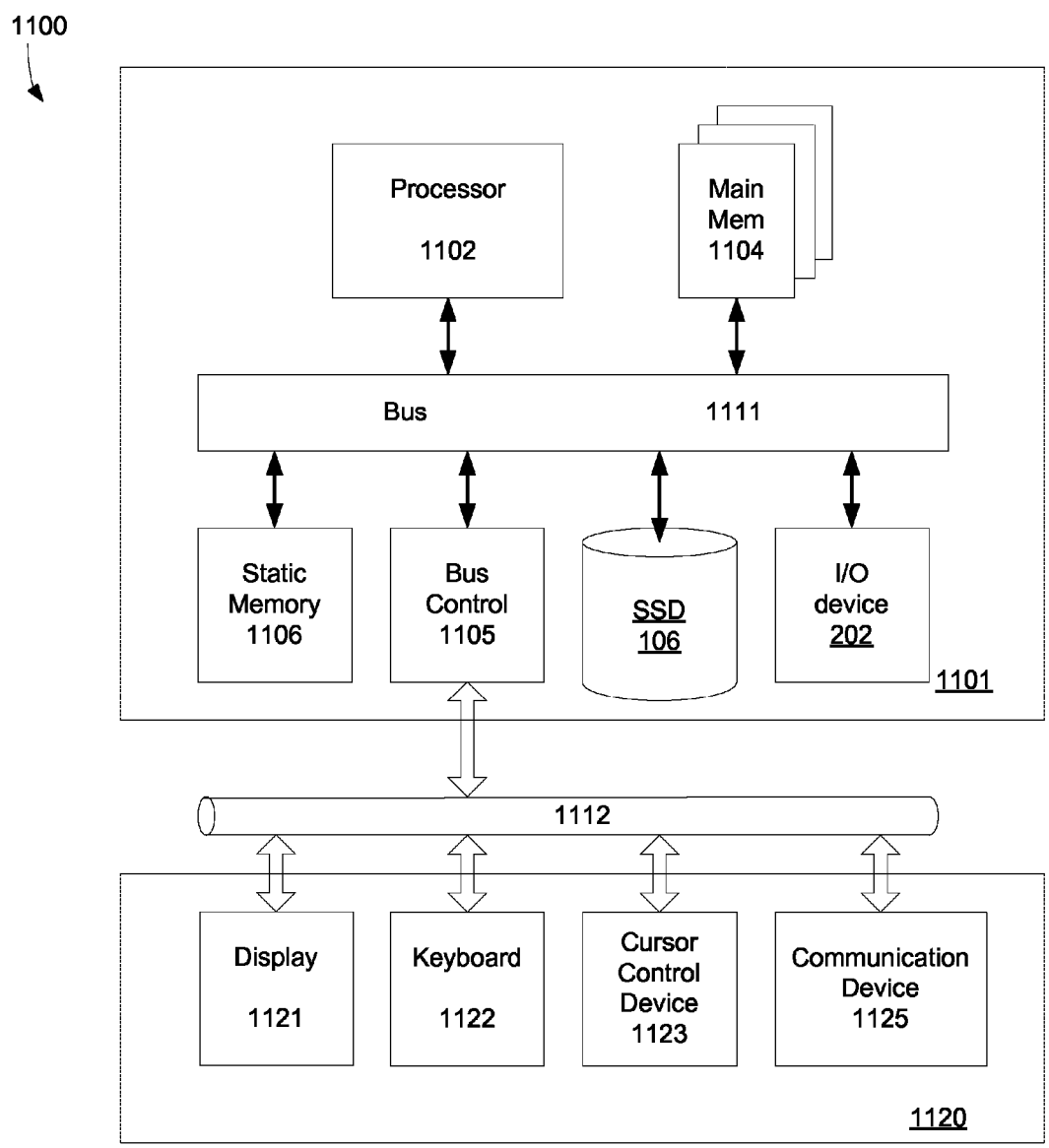
FIG. 11 is a block diagram illustrating a digital processing system capable of implementing dual memory access in accordance with one embodiment of the present invention.

Having briefly described one embodiment of the computer network in which the embodiment(s) of the present invention operates, FIG. 11 illustrates an example of a computer system 1100, which can be a server, a router, a switch, a node, a hub, a wireless device, or a computer system.

FIG. 11 is a block diagram illustrating a central processing system capable of implementing dual memory access in accordance with one embodiment of the present invention. Computer system or a signal separation system 1100 can include a processing unit 1101, an interface bus 1111, and an input/output ("IO") unit 1120. Processing unit 1101 includes a processor 1102, a main memory 1104, a system bus 1111, a static memory device 1106, a bus control unit 1105, a SSD as mass storage memory 106, and a signal separation access unit 1109. It should be noted that the underlying concept of the exemplary embodiment(s) of the present invention would not change if one or more blocks (circuit or elements) were added to or removed from diagram 1100.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112. Mass storage memory or SSD 106, which may be a magnetic disk, an optical disk, hard disk drive, floppy disk, CD-ROM, and/or flash memories are used for storing large amounts of data.

I/O unit 1120, in one embodiment, includes a display 1121, keyboard 1122, cursor control device 1123, and communication device 1125. Display device 1121 may be a liquid crystal device, cathode ray tube ("CRT"), touchscreen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers 104 via a network infrastructure such as the infrastructure illustrated in FIG. 11.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A digital processing system, comprising:
   a non-volatile memory device configured to store data persistently;
   a peripheral bus coupled to the non-volatile memory device and configured to support memory access to the non-volatile memory device; and
   a digital processing unit coupled to the peripheral bus and configured to perform a direct memory access to at least a portion of storage space in the non-volatile memory device as a system memory instead of input/output ("I/O") device in accordance with extended memory address referenced from a first address field of an instruction executing by the digital processing unit, wherein the digital processing unit further configured to access I/O storage portion of the non-volatile memory device using a virtual address different from the extended address referenced from a second address field of the instruction.

2. The system of claim 1, further includes a cache coupled to the digital processing unit and able to buffer information between the peripheral bus coupled with the non-volatile memory device and the digital processing unit.

3. The system of claim 1, further includes a bus interface coupled to the peripheral bus and configured to provide a function of dual memory access capable of facilitating direct memory access to the non-volatile memory device.

4. The system of claim 3, wherein the bus interface is configured to provide a function of input/output ("I/O") storage access able to access data to a portion of the non-volatile memory device via I/O access.

5. The system of claim 1, wherein the non-volatile memory device is one of flash memory, phase-change memory, and magnetoresistive random-access memory ("MRAM").

6. The system of claim 1, wherein the non-volatile memory device is a flash memory solid state drive ("SSD") includes an address translation component able to provide a function of flash translation layer.

7. The system of claim 1, wherein the peripheral bus is a peripheral component interconnect express ("PCIe") bus capable of facilitating word addressable memory access to the non-volatile memory device.

8. The system of claim 1, wherein the digital processing unit is configured to access at least a portion of flash memory solid state drive ("SSD") as storage class memory.

9. The system of claim 1, wherein the digital processing unit is able to pre-fetch information stored in a flash memory solid state drive ("SSD") to reduce access latency.

10. A method for providing dual mode memory access, comprising:
    issuing a direct memory access by a digital processing unit as a system memory access instead of an input/output ("I/O") storage for reading information stored at a first storage location addressed by an expanded memory address loaded from a first address field of an instruction executing by the digital processing unit;
    identifying the first storage location in a flash memory solid state drive ("SSD") in accordance with the expanded memory address;
    fetching the information stored in the first storage location from the flash memory SSD to a cache and reading the information from the cache; and
    accessing I/O storage of the flash memory SSD addressed by a virtual storage address loaded from a second address field of the instruction.

11. The method of claim 10, comprising issuing an input/output ("I/O") access for reading data stored at a second storage location in the flash memory SSD.

12. The method of claim 11, comprising obtaining the data from the second location of the flash memory SSD in accordance with a logical block address ("LBA").

13. The method of claim 10, wherein fetching the information stored in the first storage location includes issuing a pre-fetch instruction to preload a portion of data from the flash memory SSD to reduce memory access latency.

14. The method of claim 10, further comprising communicating with the flash memory SSD via a flash translation layer.

15. A method for providing dual mode memory access, comprising:

issuing a memory access by a digital processing unit as a system memory access instead of an input/output ("I/O") storage for writing information to a first storage location addressed by an expanded memory address retrieved from a first address field of an instruction executing by the digital processing unit;

identifying the first storage location in a flash memory solid state drive ("SSD") in accordance with the expanded memory address;

writing the information to a buffer which is situated between the digital processing unit and the flash memory SSD and transmitting the information from the buffer to the first storage location of the flash memory SSD; and accessing I/O storage of the flash memory SSD addressed by a virtual storage address loaded from a second address field of the instruction.

16. The method of claim 15, comprising issuing an input/output ("I/O") access to an I/O controller for writing data to a second storage location in the flash memory SSD.

17. The method of claim 16, comprising storing the data to the second location of the flash memory SSD in accordance with a logical block address ("LBA").

18. The method of claim 15, further comprising communicating with the flash memory SSD via a flash translation layer.

19. The method of claim 15, wherein writing the information to a buffer includes, searching a buffer list to determine whether the buffer is on the buffer list;

requesting a new buffer for cache space if the buffer is absent on the buffer list;

identifying the new buffer in accordance with at least one pointer when free buffer space is not available;

reading block content from a block pointed by a logic block address ("LBA") which is associated with the new buffer;

merging the block content with information currently in the new buffer to form merged content and writing the merged content to a non-volatile memory; and issuing a free buffer signal indicating availability of the new buffer.

20. The method of claim 15, wherein transmitting the information from the buffer to the first storage location of the flash memory SSD includes continuing next writing if current memory buffer has additional storage space.

* * * * *